(12) United States Patent
Smith et al.

(10) Patent No.: US 11,933,182 B2
(45) Date of Patent: Mar. 19, 2024

(54) MULTI-CHANNEL MULTI-RANGE TRANSDUCER (71) Applicant: PRATT & WHITNEY CANADA CORP., Longueuil (CA)

(72) Inventors: Michael Paul Smith, Mississauga (CA); Piotr Szczesnowicz, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 727 days.

(21) Appl. No.: 16/827,939

(22) Filed: Mar. 24, 2020

(65) Prior Publication Data
US 2021/0301675 A1   Sep. 30, 2021

(51) Int. Cl.
*F01D 17/08* (2006.01)
*F01D 21/00* (2006.01)
*G01K 1/02* (2021.01)
*G01K 13/00* (2021.01)
*G01L 15/00* (2006.01)

(52) U.S. Cl.
CPC .......... *F01D 17/08* (2013.01); *F01D 17/085* (2013.01); *F01D 21/003* (2013.01); *G01K 1/026* (2013.01); *G01K 13/00* (2013.01); *G01L 15/00* (2013.01)

(58) Field of Classification Search
CPC ...... F01D 17/08; F01D 17/085; F01D 21/003; G01K 1/026; G01K 13/00; G01K 13/024; G01K 17/08; G01L 15/00
See application file for complete search history.

(56) References Cited

U.S. PATENT DOCUMENTS

| 7,204,076 | B2 | 4/2007 | Griffiths et al. |
| 9,857,822 | B2 | 1/2018 | Petrosky et al. |
| 2010/0257936 | A1* | 10/2010 | Kurtz .................. G01L 9/06 73/721 |
| 2011/0231110 | A1* | 9/2011 | Johnston ............. G01M 5/0091 356/625 |
| 2012/0101756 | A1* | 4/2012 | Leung .................... G01K 1/026 702/64 |
| 2012/0198849 | A1* | 8/2012 | Johnston ............... G01N 21/00 60/722 |
| 2013/0118183 | A1* | 5/2013 | Wang ..................... F01D 17/20 250/339.04 |

* cited by examiner

Primary Examiner — Arun Goyal
(74) Attorney, Agent, or Firm — NORTON ROSE FULBRIGHT CANADA LLP (57) ABSTRACT There is described a multi-channel, multi-range transducer for measuring a parameter, the transducer comprising N channels and M sensing elements, the M sensing elements centered on distinct calibration points of distinct measuring ranges, the M sensing elements distributed across the N channels of the transducer, wherein sensing elements having adjacent measuring ranges are provided in different ones of the N channels.

13 Claims, 7 Drawing Sheets

MULTI-CHANNEL MULTI-RANGE TRANSDUCER

TECHNICAL FIELD

The present disclosure relates generally to transducers, and more particularly to transducers having multiple sensing elements.

BACKGROUND OF THE ART

A transducer is a device that converts energy from one form to another. Usually, a transducer converts a signal in one form of energy to a signal in another. Transducers are used in many different fields, such as aviation, automation, and robotics. They may be used to measure various parameters, such as pressure, temperature, flow, and level. While prior art transducers are suitable for certain applications, there is room for improvement.

SUMMARY

In accordance with a broad aspect, there is provided a multi-channel, multi-range transducer for measuring a parameter, the transducer comprising N channels and M sensing elements, the M sensing elements centered on distinct calibration points of distinct measuring ranges, the M sensing elements distributed across the N channels of the transducer, wherein sensing elements having adjacent measuring ranges are provided in different ones of the N channels.

In accordance with another broad aspect, there is provided a system for operating a gas turbine engine. The system comprises a multi-channel engine controller having a processor and a non-transitory computer readable medium having stored thereon program instructions executable by the processor for controlling the gas turbine engine. The system comprises a multi-channel, multi-range transducer operatively connected to the engine controller for providing thereto a measured parameter from the gas turbine engine, the transducer comprising N channels and M sensing elements, the M sensing elements centered on distinct calibration points of distinct measuring ranges, the M sensing elements distributed across the N channels of the transducer, wherein sensing elements having adjacent measuring ranges are provided in different ones of the N channels Features of the systems, devices, and methods described herein may be used in various combinations, in accordance with the embodiments described herein. More particularly, any of the above features may be used together, in any combination.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There is described herein a transducer architecture and design methodology for optimizing the number of sensing elements needed for multi-channel, multi-range capabilities. In some embodiments, the transducer is coupled to a gas turbine engine and used by an engine controller to obtain measurements of a given parameter, such as pressure, temperature, flow, level, etc, of the gas turbine engine. Other applications for the multi-channel, multi-range transducer as described herein are also considered.

Figure 1:
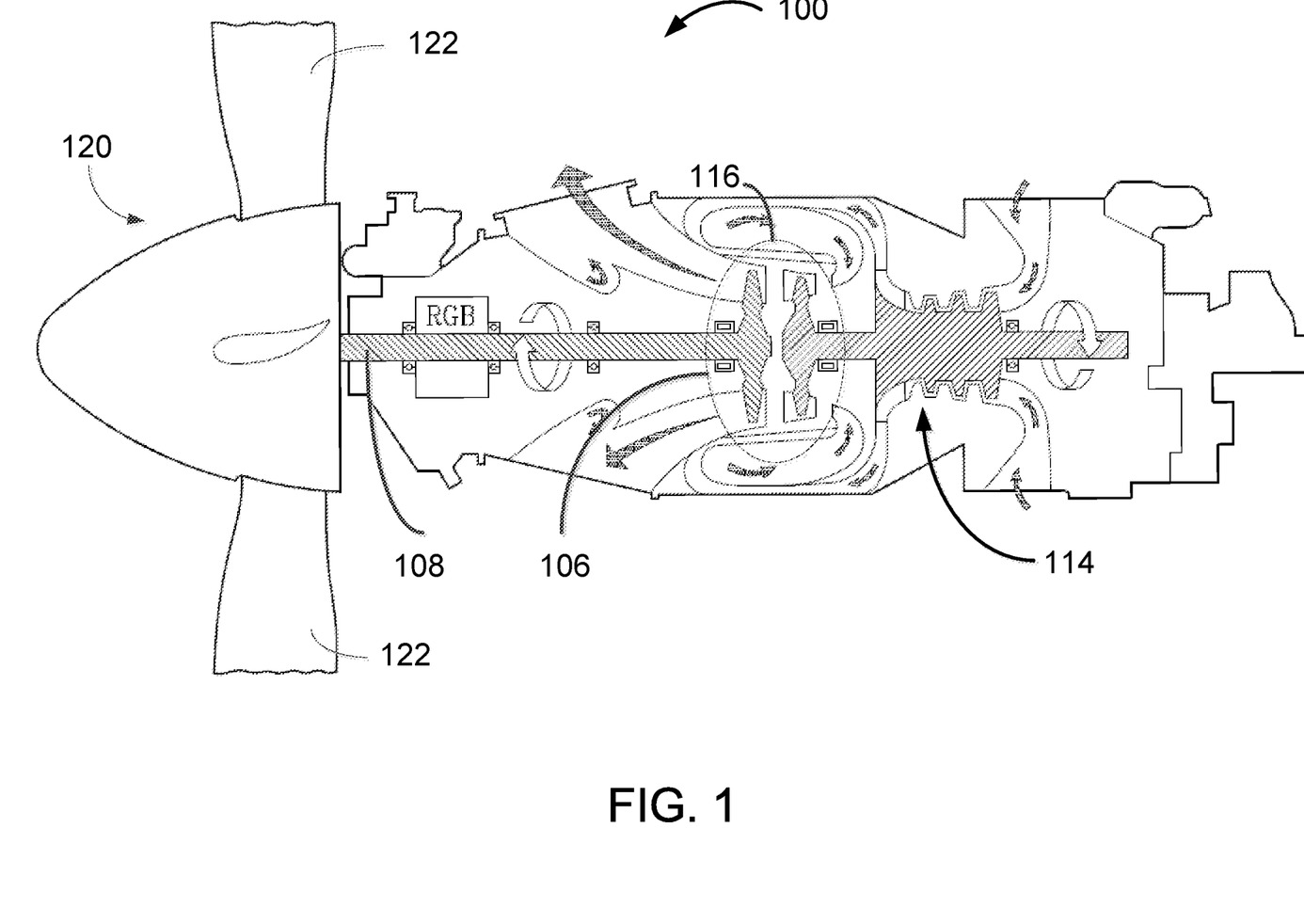
FIG. 1 is a schematic cross-sectional view of an example gas turbine engine.

An example gas turbine engine 100 is illustrated in FIG. 1. The engine 100 generally comprises in serial flow communication a propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases driving the rotation of the propeller through shaft 108. In some embodiments, the engine 100 is used within an aircraft. The propeller 120 converts rotary motion from the shaft 108 of the engine 100 to provide propulsive force for the aircraft. The propeller 120 comprises two or more propeller blades 122 of which a blade angle may be adjusted. The engine 100 may be implemented as a single or multi-spool engine, where the turbine section 106 is typically connected to the propeller 120 through a reduction gearbox (RGB).

Although illustrated as a turboprop engine, the engine 100 may alternatively be another type of gas turbine engine, for example a turbofan engine, generally comprising in serial flow communication a compressor section, a combustor, and a turbine section, and a fan through which ambient air is propelled. A turboshaft engine may also apply. In addition, although the gas turbine engine 100 is described herein for flight applications, it should be understood that other uses, such as industrial or the like, may apply.

Figure 2:
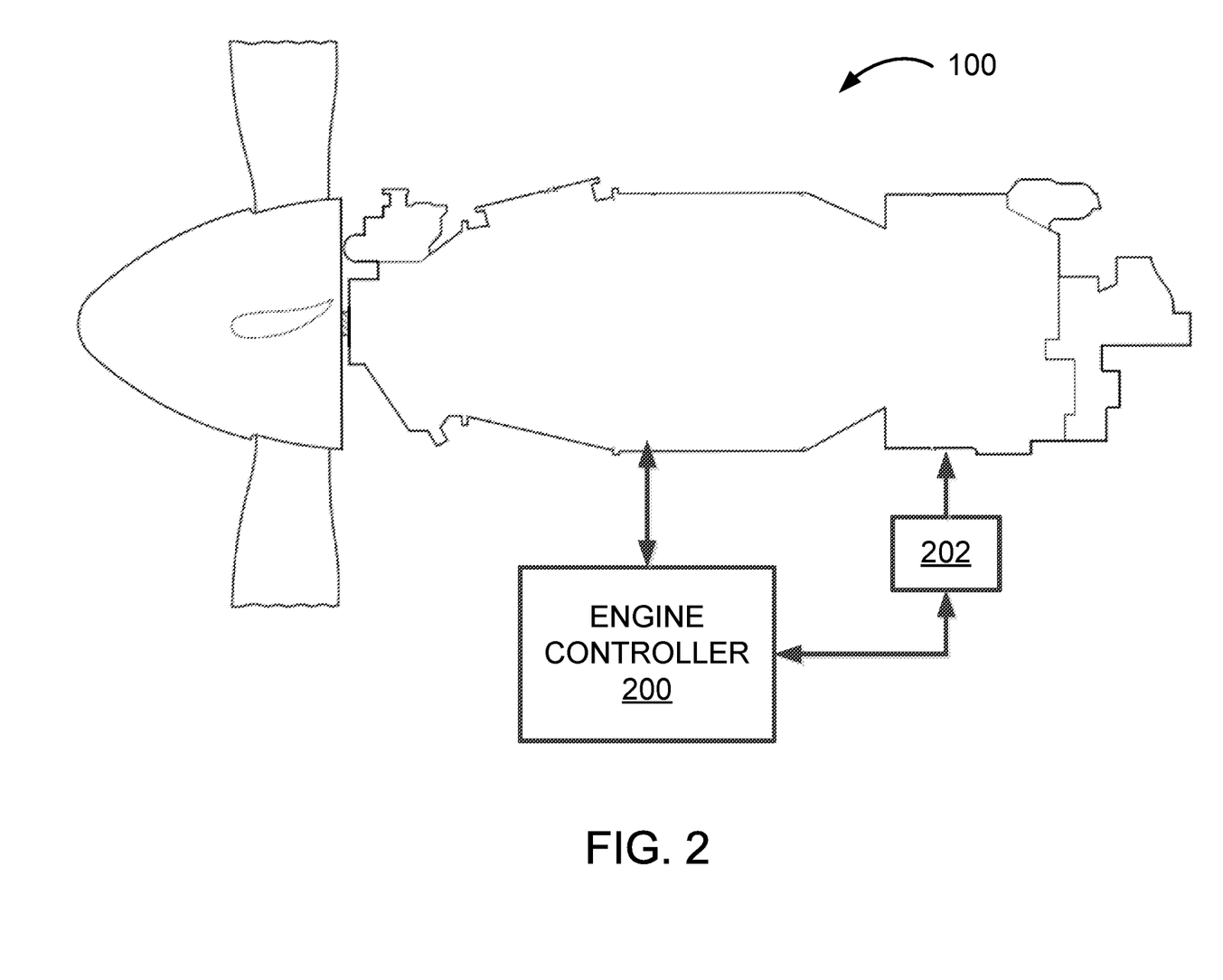
FIG. 2 illustrates the engine of FIG. 1 with additional elements coupled thereto.

Referring now to FIG. 2, the engine 100 is operatively connected to an engine controller 200. Generally, the engine controller 200 is configured to control the engine 100 based on received inputs. The engine controller 200 controls the engine 100 by outputting a fuel flow request to an engine actuator for adjusting engine fuel flow and controls the propeller 120 by outputting a propeller blade angle request to a propeller actuator for adjusting the blade angle of the propeller 120. The engine controller 200 determines the fuel flow request for adjusting engine fuel flow and the propeller blade angle request for adjusting the blade angle of the propeller 120 based on the received inputs. While the engine controller 200 is illustrated as separate from the engine 100, it should be understood that this is for illustrative purposes only and that the engine controller 200 may, in some embodiments, be integrated with the gas turbine engine 100. In some embodiments, the propeller 120 is controlled by a separate controller, such as a propeller control unit (PCU).

In some embodiments, the engine controller 200 is operatively connected to one or more transducer 202, such as a pressure transducer, a temperature transducer, and the like. The transducer 202 is coupled to the engine 100 for obtaining measurements of a given parameter, such as pressure or temperature, which may then be used as input to the engine controller 200 for controlling operation of the engine 100. For example, pressure and/or temperature measurements may be used in order to determine the fuel flow request and/or the propeller blade angle request. Although a single transducer 202 is illustrated, it will be understood that multiple transducers 202, of different types, may be coupled to the engine 100 at different positions thereof. For example, a pressure transducer may be provided at different pressure stations of the engine 100 (i.e. P1-P9), and a temperature transducer may be provided at different temperature stations (i.e. T1-T9) of the engine 100. All such transducers 202 may be operatively connected to the engine controller 200 for providing respective measurements thereto.

In some embodiments, the engine controller 200 is a multi-channel controller. Multi-channel engine controllers may be used, for example, to duplicate certain engine functions so as to add redundancy to the system. Alternatively, multi-channel controllers may be used to separate various engine functions of the controller 200 among the channels. For example, higher criticality functions may be operated through a first channel and lower criticality functions may be operated through a second channel. Other embodiments for operating an engine 100 using a multi-channel engine controller 200 may also apply.

Figure 3A:
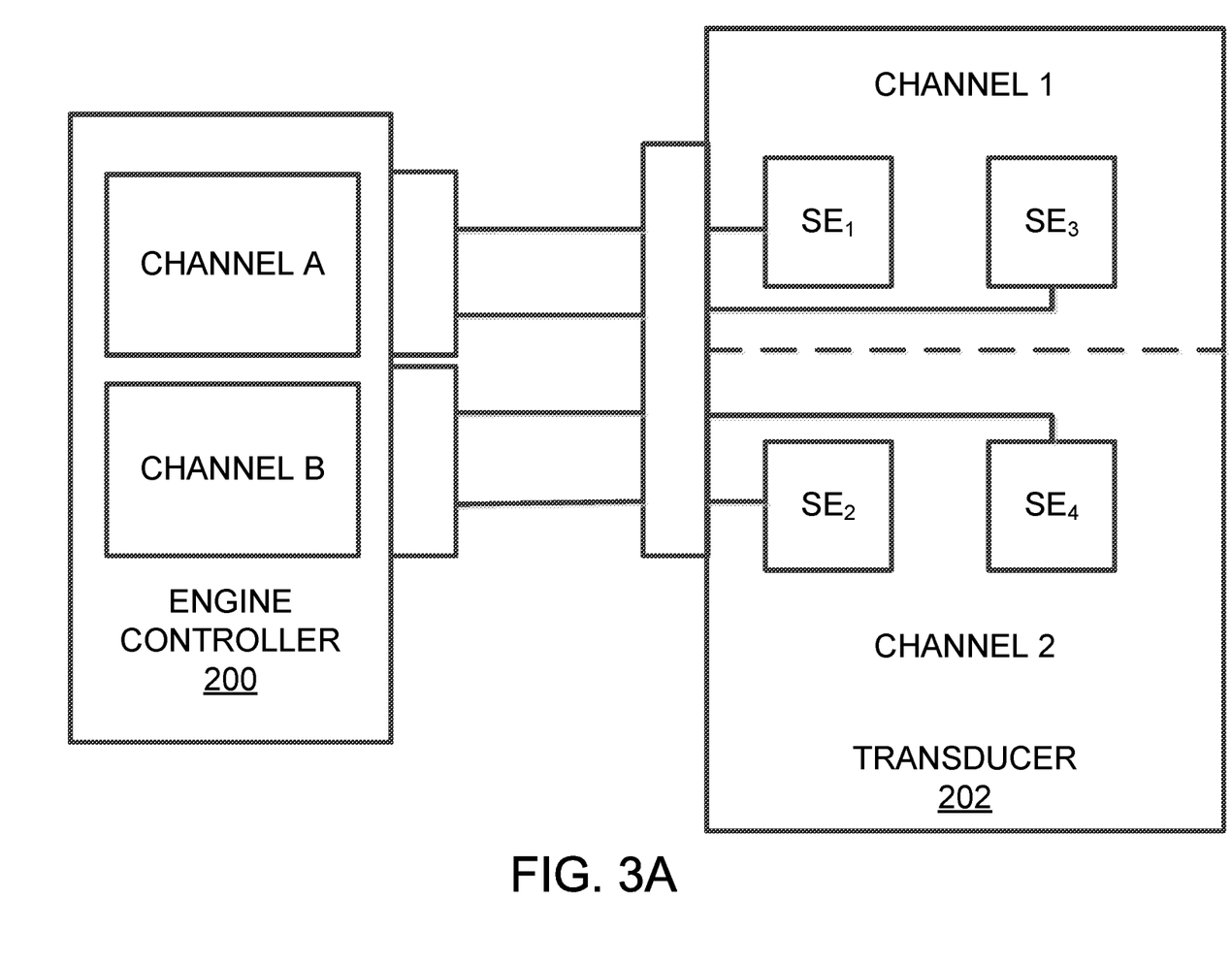
FIGS. 3A-3C are block diagrams of example embodiments of a transducer and an engine controller.

Reference is made to FIG. 3A to show an example embodiment of the transducer 202 coupled to a multi-channel engine controller 200, which in this case is a dual channel controller having channel A and channel B. The transducer 202 is a multi-channel, multi-range transducer, operable over a given operating range. The transducer 202 comprises a first sensing element $SE_1$ associated with a first channel of the transducer 202 and a second sensing element $SE_2$ associated with a second channel of the transducer 202. As used herein, the expression "sensing element" refers to any device that receives a signal or stimulus (such as heat, pressure, light, motion, etc) and responds to it in a distinctive manner. The sensing elements may be analog, digital or a combination thereof. Examples of pressure sensing elements are absolute pressure sensors, gauge pressure sensors, vacuum pressure sensors, differential pressure sensors, and sealed pressure sensors. Various pressure-sensing technologies may be used, such as capacitive, electromagnetic, piezoelectric, strain-gauge, optical, potentiometric, force balancing, resonant, thermal, and ionization. Examples of temperature sensing elements are negative temperature coefficient (NTC) thermistors, resistance temperature detectors (RTD), thermocouples, infrared sensors, thermometers, and semi-conductor based sensors. Other embodiments are also applicable.

Figure 4:
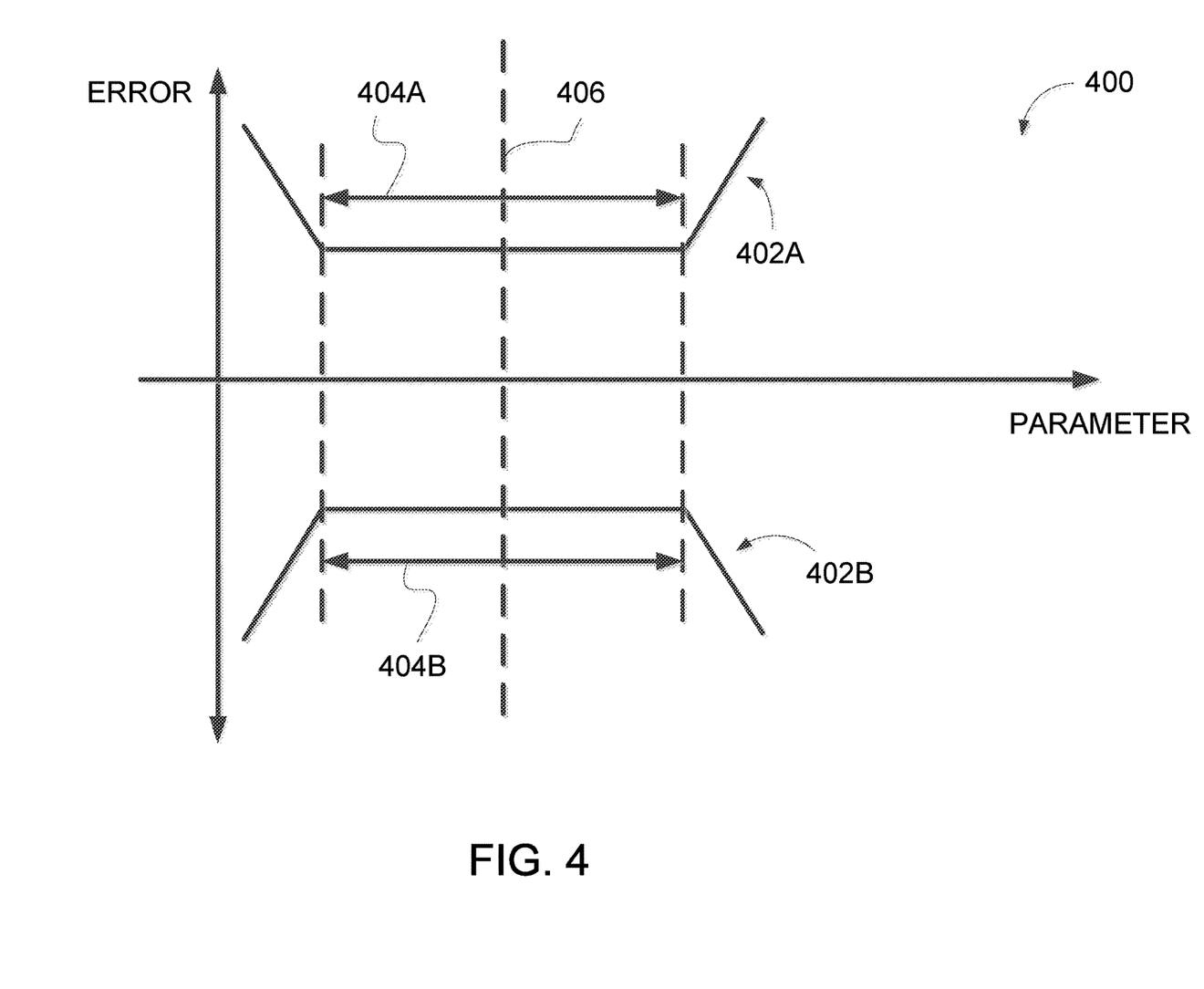
FIG. 4 is a graph illustrating calibration of a sensing element.

The first sensing element $SE_1$ is centered on a first calibration point of a first measuring range. The second sensing element $SE_2$ is centered on a second calibration point of a second measuring range. Calibration is an adjustment or a set of adjustments performed on a sensing element to make the sensing element function as accurately, or error free as possible. Proper sensor calibration will yield accurate measurements for a given measuring range. Reference is made to the graph 400 of FIG. 4. Curves 402A, 402B illustrate a mapping of a measured parameter with respect to an error, where curve 402A illustrates the positive error and curve 402B illustrates the negative error. The error stays minimal and relatively constant within a measuring range 404A, 404B, and increases outside of the measuring range 404A, 404B. The calibration point 406 is found substantially in the middle of the measuring range 404A, 404B. Setting the calibration point 406 essentially defines the measuring range 404A, 404B for which a certain accuracy of measurement can be expected.

Referring back to FIG. 3A, the calibration points of the first and second sensing elements $SE_1$, $SE_2$ are distinct and the sensing elements are distributed across the channels of the transducer. Each sensing element therefore measures a distinct measuring range, meaning that they are not exactly the same. In some embodiments, the measuring ranges of the first and second sensing elements $SE_1$, $SE_2$ are sequential and have substantially little or no overlap. For example, the measuring range of first sensing element $SE_1$ is 0-100 psi (in the case of pressure sensing elements), and the measuring range of the second sensing element $SE_2$ is 100-200 psi, such that the operating range of the transducer 202 is 0-200 psi. In this case, redundancy may still be achieved for the engine controller 200 through cross-channel communication. A measuring channel, for example Channel A, can compare its measurement to a measurement of another channel, for example Channel B, to verify if its measurement is in the overall operating range of the transducer 202. This can be used to detect an out-of-range failure mode, where a signal falls outside of an expected operating range of the transducer 202. Cross-channel communication may also be used to detect cross-channel mismatch, where the absolute different between Channel A measurements and Channel B measurements is outside of a threshold.

In some embodiments, the measuring ranges of the first and second sensing elements $SE_1$, $SE_2$ overlap in part. For example, the measuring range of first sensing element $SE_1$ is 0-100 psi, and the measuring range of the second sensing element $SE_2$ is 50-150 psi, such that the operating range of the transducer 202 is 0-150 psi. In this case, a loss of channel in the engine controller 200, for example Channel A, may be addressed by accessing the measurement of another channel, for example Channel B, with no loss of accuracy for measurements between 50-150 psi and a loss of accuracy for measurements between 0-50 psi. Note that a loss of channel may also be addressed through cross-channel communication in the case of no overlap between the measuring ranges of sensing elements, albeit with a loss of accuracy for the entire measuring range of the sensing element in the lost channel.

In some embodiments, the transducer 202 further comprises a third sensing element $SE_3$ associated with the first channel of the transducer 202 and centered on a third calibration point of a third measuring range, and a fourth sensing element $SE_4$ associated with the second channel of the transducer 202 and centered on a fourth calibration point of a fourth measuring range. All four calibration points (i.e. of $SE_1$-$SE_4$) are distinct. Table 1 below illustrates an example embodiment of the transducer 202 as illustrated in FIG. 3A.

TABLE 1

| MEASURING RANGE | CALIBRATION POINT | TRANSDUCER CHANNEL 1 | TRANSDUCER CHANNEL 2 |
|---|---|---|---|
| 0-100 | 50 | $SE_1$ | — |
| 100-200 | 150 | — | $SE_2$ |
| 200-300 | 250 | $SE_3$ | — |
| 300-400 | 350 | — | $SE_4$ |

The example of Table 1 corresponds to a dual channel transducer having an operating range of 0-400 psi, with four sensing elements each having a distinct and substantially non-overlapping measuring range. Other embodiments are also considered, for example having a smaller operating range for the transducer 202 with some overlap between the measuring ranges of the sensing elements.

In some embodiments, each sensing element of the transducer can operate over the entire operating range of the transducer 202, but with reduced accuracy outside of its own measuring range centered at its calibration point. This allows the transducer 202 to function with the loss of one or more channel. Using the example of Table 2 below, where Channel 2 of the transducer 202 is lost, the engine controller 200 can use readings from the sensing elements of the functional channel to cover for the non-functional sensing elements.

TABLE 2

| MEASURING RANGE | CALIBRATION POINT | TRANSDUCER CHANNEL 1 | TRANSDUCER CHANNEL 2 |
|---|---|---|---|
| 0-100 | 50 | $SE_1$ | — |
| NA | NA | — | NA |
| 200-300 | 250 | $SE_3$ | — |
| NA | NA | — | NA |

In some embodiments, adjacent measuring ranges are provided in different channels, such that if a channel fails, the sensing element with an adjacent measuring range to the failed sensing element may be used for measurement. The overall number of sensing elements needed for a redundant multi-range transducer is optimized by staggering the calibrated sensing elements across the channels of the transducer such that the measuring ranges at most partially overlap and adjacent ranges are in different channels.

The example embodiment of FIG. 3A may be generalized to N sensing elements for the transducer 202, staggered across the first and second channels of the transducer 202, as exemplified in Table 3 below.

TABLE 3

| MEASURING RANGE | CALIBRATION POINT | TRANSDUCER CHANNEL 1 | TRANSDUCER CHANNEL 2 |
|---|---|---|---|
| Range 1 | Point 1 | $SE_1$ | — |
| Range 2 | Point 2 | — | $SE_2$ |
| . | . | . | . |
| . | . | . | . |
| . | . | . | . |
| Range N | Point N | — | $SE_N$ |

Figure 3B:
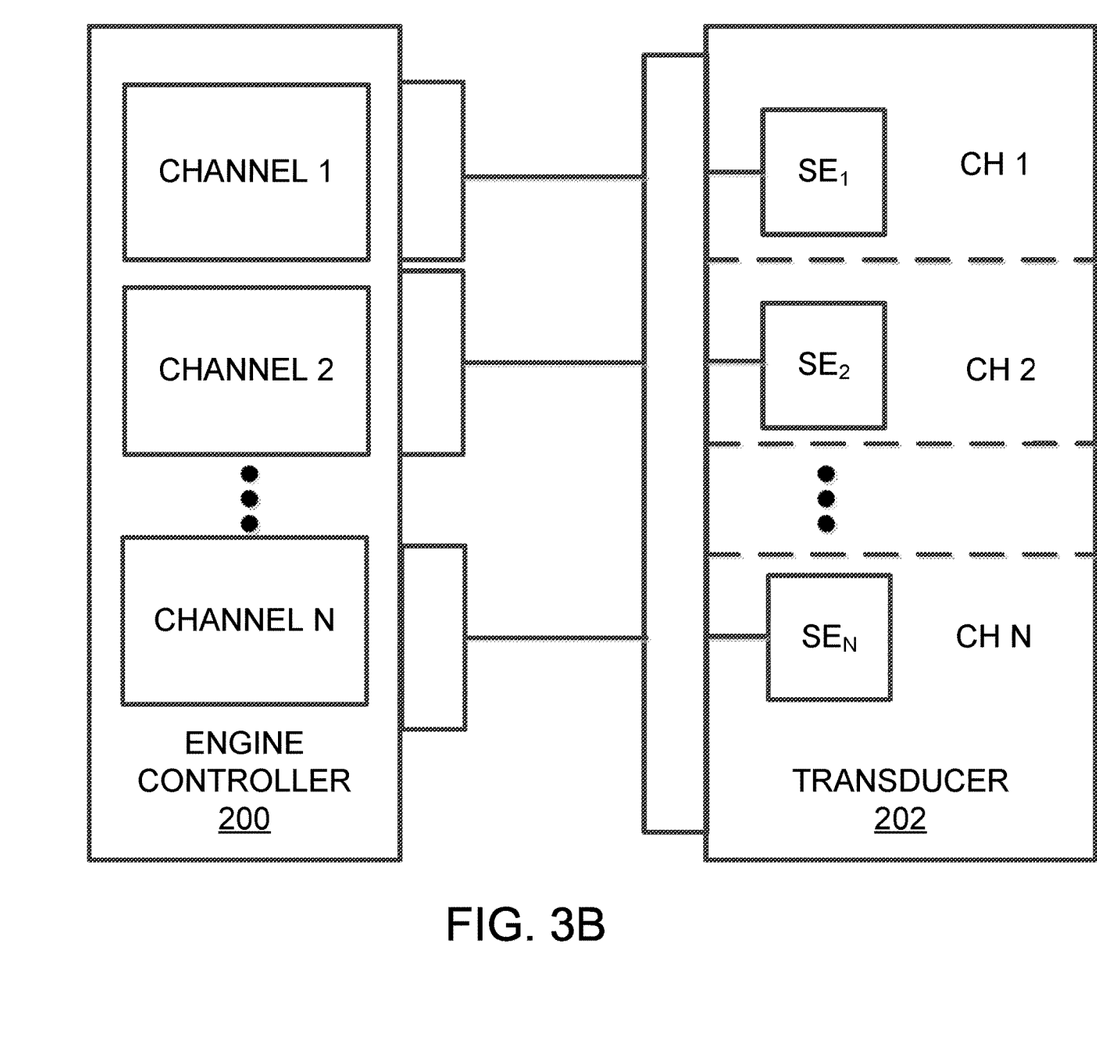

In another embodiment, the transducer 202 comprises N channels. An example is illustrated in FIG. 3B. In this example, the engine controller 200 also has N channels. Note that the number of channels for the transducer 202 and the engine controller 200 does not need to be the same. In this example, each one of the N sensing elements is associated with one of the N channels of the transducer 202 and centered on an Nth calibration point of an Nth measuring range. The N calibration points are distinct from one another.

Figure 3C:
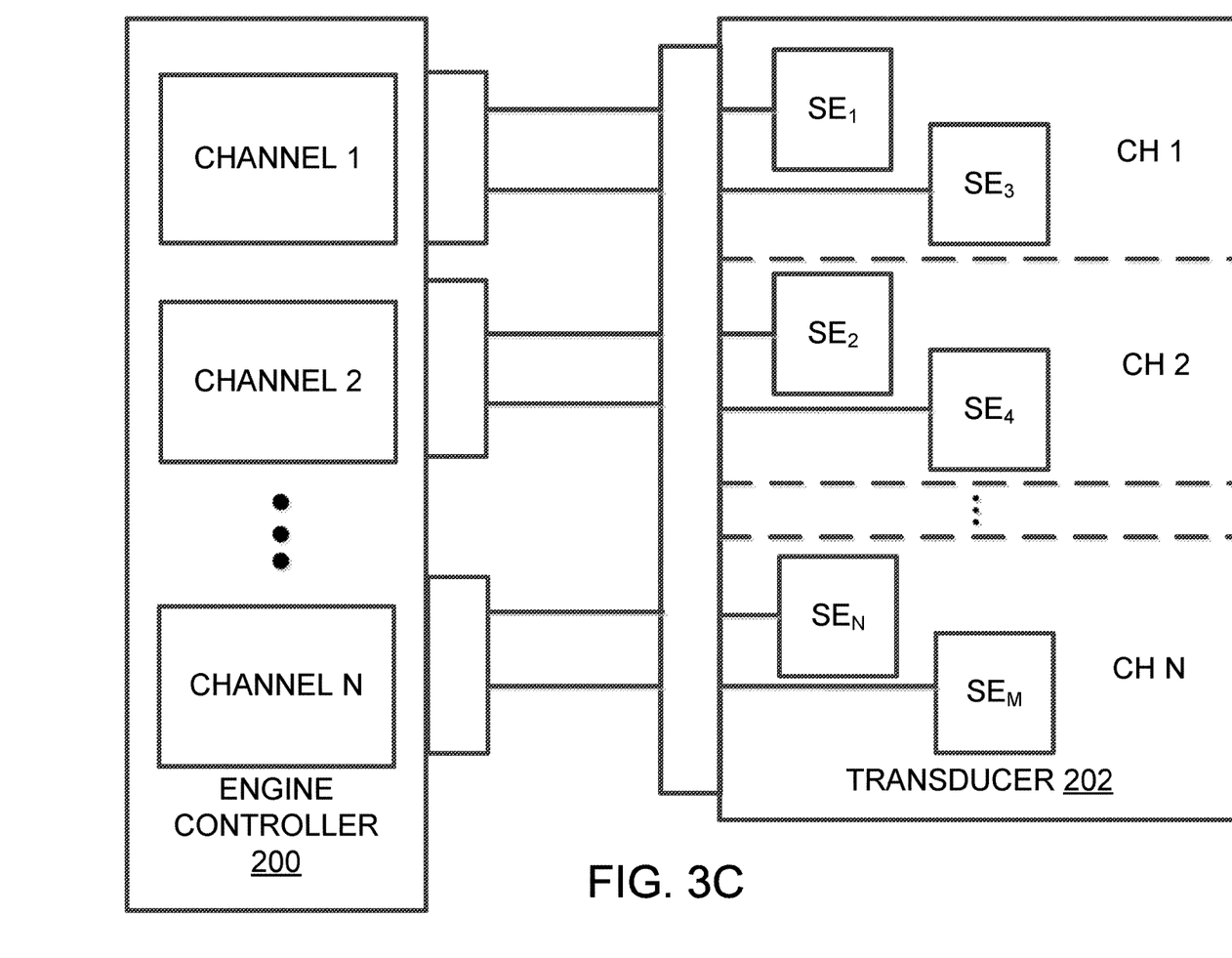

Yet another embodiment is illustrated in FIG. 3C, where the transducer 202 has N channels and M sensing elements, where M≠N and M>N. Each one of the M sensing elements is associated with one of the N channels of the transducer 202 and centered on an Mth calibration point of an Mth measuring range. The M calibration points are distinct from one another. Although two sensing elements are illustrated per transducer channel for this example, three or more sensing elements may be provided per channel. In addition, each channel of the transducer 202 does not need to have the same number of sensing elements.

In some embodiments, the transducer 202 is designed as a function of its operating range and the measuring ranges of its sensing elements. For example, for a desired operating range of 0-800 psi, four sensing elements may be used if a sensing element having a measuring range of 200 psi has sufficient accuracy. Indeed, it may be challenging to find sensing elements with a desired accuracy over a wide sensing range. Therefore, instead of using four sensing elements with a measuring range of 200 psi, the transducer 202 may be designed with six sensing elements with a measuring range of 150 psi, or eight sensing elements with a measuring range of 100 psi. The width of the measuring range of the sensing elements may therefore dictate how many sensing elements are used for a transducer having a given operating range. The absence of the need for duplicated measuring ranges reduces the overall number of sensing elements needed.

It will be understood that all of the numerical values used herein are for illustrative purposes only. These values are used to illustrate specific and non-limiting examples and may vary depending on practical implementations.

When a sensing element and/or a transducer channel fails, the engine controller 200 is configured for selecting another sensing element and/or transducer channel from which to obtain a measurement. In some embodiments, a sensing element having a measuring range adjacent to a sensing element of a lost channel is selected by the engine controller 200. In some embodiments, the engine controller 200 is configured for detecting an out of range error of the transducer by comparing measurements from different channels of the transducer 202. In some embodiments, the engine controller 200 is configured for detecting a cross-channel mismatch by comparing an absolute difference between measurements obtained from sensing elements of different channels of the transducer 202.

Figure 5:
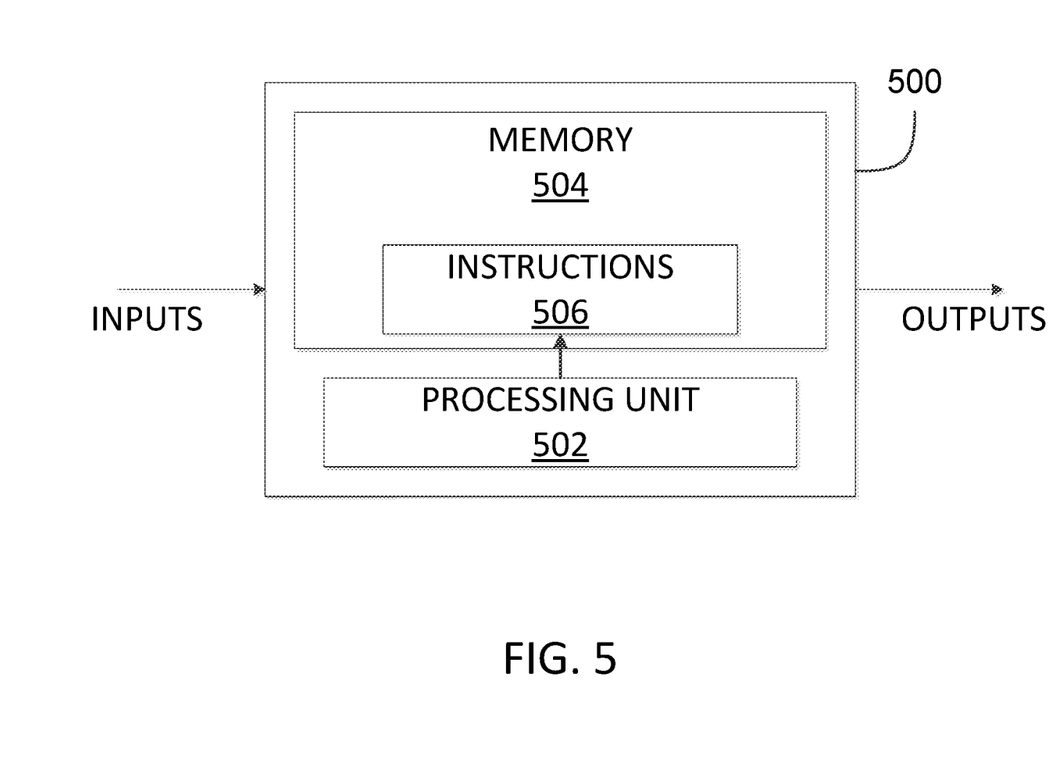
FIG. 5 is a block diagram of an example computing device for implementing the engine controller of FIG. 2.

With reference to FIG. 5, an example of a computing device 500 is illustrated for implementing the engine controller 200. The controller 200 may be implemented with one or more computing devices 500. Note that the controller 200 can be implemented as part of a full-authority digital engine controls (FADEC) or other similar device, including electronic engine control (EEC), engine control unit (ECU), electronic propeller control, propeller control unit, and the like.

The computing device 500 comprises a processing unit 502 and a memory 504 which has stored therein computer-executable instructions 506. The processing unit 502 may comprise any suitable devices configured to implement the method 400 such that instructions 506, when executed by the computing device 500 or other programmable apparatus, may cause the functions/acts/steps performed as part of the method 400 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods performed by the engine controller 200 may be implemented in a high level procedural or object oriented programming or scripting language, or a combination thereof. Alternatively, the methods performed by the engine controller 200 may be implemented in assembly or machine language. The language may be a compiled or interpreted language. Program code for implementing the methods performed by the engine controller 200 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods performed by the engine controller 200 may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the multi-range, multi-channel transducer as described does not need to be used with an engine controller. It can be used in a wide variety of applications with other types of control systems and/or circuits. Yet further modifications could be implemented by a person of ordinary skill in the art in view of the present disclosure, which modifications would be within the scope of the present technology.

The invention claimed is:

1. A multi-channel, multi-range transducer for measuring a parameter, the transducer comprising N channels and M sensing elements, the M sensing elements centered on distinct calibration points of distinct measuring ranges, the M sensing elements distributed across the N channels of the transducer and operable over an entire operating range of the transducer, wherein the M sensing elements having adjacent measuring ranges are provided in different ones of the N channels such that each of the N channels consists of distinct and non-overlapping measuring ranges covering the entire operating range of the transducer.

2. The transducer of claim 1, wherein $M \neq N$ and $M > N$.

3. The transducer of claim 1, wherein $N=2$ and M is an even number greater than 2.

4. The transducer of claim 1, wherein the parameter is pressure or temperature of a gas turbine engine.

5. A system for operating a gas turbine engine, the system comprising:
a multi-channel engine controller having a processor and a non-transitory computer readable medium having stored thereon program instructions executable by the processor for controlling the gas turbine engine; and
a multi-channel, multi-range transducer operatively connected to the engine controller for providing thereto a measured parameter from the gas turbine engine, the transducer comprising N channels and M sensing elements, the M sensing elements centered on distinct calibration points of distinct measuring ranges, the M sensing elements distributed across the N channels of the transducer and operable over an entire operating range of the transducer, wherein the M sensing elements having adjacent measuring ranges are provided in different ones of the N channels such that each of the N channels consists of distinct and non-overlapping measuring ranges covering the entire operating range of the transducer.

6. The system of claim 5, wherein the multi-channel engine controller is a dual-channel engine controller, and $N=2$.

7. The system of claim 5, wherein $M \neq N$ and $M > N$.

8. The system of claim 5, wherein $N=2$ and M is an even number greater than 2.

9. The system of claim 5, wherein the parameter is pressure or temperature of the gas turbine engine.

10. The system of claim 5, wherein the multi-channel engine controller is operable for obtaining a measurement of the parameter by selecting, via the program instructions executable by the processing unit, at least one of the N channels of the transducer.

11. The system of claim 10, wherein the multi-channel engine controller is operable, in case of a lost channel of the N channels of the transducer, for obtaining the measurement of the parameter by selecting at least one of the N channels having a sensing element of the M sensing elements with a measuring range adjacent to a sensing element of the M sensing elements in the lost channel.

12. The system of claim 5, wherein the multi-channel engine controller is operable for obtaining a measurement of the parameter by selecting, via the program instructions executable by the processing unit, at least one of the M sensing elements.

13. The system of claim 5, wherein the multi-channel engine controller is operable for detecting a cross channel mismatch by comparing, via the program instructions executable by the processing unit, an absolute difference between a first measurement of the parameter obtained by a first sensing element of the M sensing elements of a first one of the N channels and a second measurement of the parameter obtained by a second sensing element of the M sensing elements of a second one of the N channels.

* * * * *